United States Patent
Hu et al.

(10) Patent No.: US 10,168,545 B2
(45) Date of Patent: Jan. 1, 2019

(54) OPTICAL IMAGE STABILIZER WITH IMPROVED MAGNETIC DISPOSITION

(71) Applicant: TDK TAIWAN CORP., Taoyuan County (TW)

(72) Inventors: Chao-Chang Hu, Taoyuan County (TW); Shu-Shan Chen, Taoyuan County (TW); Cheng-Kai Yu, Taoyuan County (TW); Yu-Hao Kuan, Taoyuan County (TW)

(73) Assignee: TDK TAIWAN CORP., Yangmei (TW)

( * ) Notice: Subject to any disclaimer, the term of this patent is extended or adjusted under 35 U.S.C. 154(b) by 60 days.

(21) Appl. No.: 14/884,965

(22) Filed: Oct. 16, 2015

(65) Prior Publication Data

US 2016/0109720 A1  Apr. 21, 2016

Related U.S. Application Data

(60) Provisional application No. 62/064,692, filed on Oct. 16, 2014.

(51) Int. Cl.
 G02B 27/64 (2006.01)
 G02B 7/09 (2006.01)
 G02B 7/10 (2006.01)

(52) U.S. Cl.
 CPC .......... G02B 27/646 (2013.01); G02B 7/102 (2013.01)

(58) Field of Classification Search
 CPC ...... G02B 27/46; G02B 27/64; G02B 27/646; G02B 7/08; G02B 7/02; G02B 7/102; G02B 7/04; H04N 5/225; H04N 5/232; H04N 5/23248; H04N 5/2257; H04N 5/2328; G11B 7/0932; G11B 7/0935; G03B 2217/005; G03B 5/00
 USPC ....... 359/557, 554, 813, 814, 819, 824, 823; 396/55, 52, 53, 54
 See application file for complete search history.

(56) References Cited

U.S. PATENT DOCUMENTS

2010/0149354 A1* 6/2010 Makimoto ........... G02B 27/646
                                                348/208.99
2012/0229901 A1* 9/2012 Moriya ................... G03B 3/10
                                                    359/557

* cited by examiner

*Primary Examiner* — Jie Lei

(74) *Attorney, Agent, or Firm* — Bacon & Thomas, PLLC

(57) ABSTRACT

The present invention discloses a lens driving device which includes a lens holder defining an optical axis and being for holding a lens; a first AF coil disposed with respect to the lens holder; an OIS coil structure having two coils respectively disposed by two sides of the lens holder on a first plane having a normal direction parallel to the optical axis; two magnets respectively disposed with respect to the respective coils and having a first surface facing the first AF coil and a second surface facing the OIS coil structure; and a circuit structure connected electrically to the OIS coil structure and taking control thereof. At least one of the two magnets and the first AF coil cooperate to drive the lens holder along the optical axis, and each of the two magnets and the OIS coil structure cooperate to drive the lens holder along a direction perpendicular to the optical axis.

6 Claims, 10 Drawing Sheets

OPTICAL IMAGE STABILIZER WITH IMPROVED MAGNETIC DISPOSITION

FIELD OF THE INVENTION

The present invention relates to a VCA-based lens driving device, and more particularly, to a VCA-based lens driving device that enables the auto-focusing (AF) and the optical image stabilization (OIS).

DESCRIPTION OF THE PRIOR ART

The optical image stabilization (OIS) with a common magnet scheme has been developed as a solution of anti-shaking for a conventional lens driving device. Driving two sets of coils, e.g. the auto-focusing (AF) coil and the OIS coils, with a common magnet set to adjust the lens assembly makes the lens driving device compact, and is thus getting widely applicable for enhancing the image quality. Nevertheless, it is found that such a conventional scheme may have an excessive amount of magnets, which leads to the failure of much more compact volume of the lens driving device.

SUMMARY OF THE INVENTION

An object of the present invention provides a VCA-based lens driving device that enables the auto-focusing and the optical image stabilization with a two-magnet scheme. The manufacturing cost is therefore decreased.

The present invention provides a lens driving device which includes a lens holder defining an optical axis and being for holding a lens; a first AF coil disposed with respect to the lens holder; an OIS coil structure having two coils respectively disposed by two sides of the lens holder on a first plane having a normal direction parallel to the optical axis; two magnets respectively disposed with respect to the respective coils and having a first surface facing the first AF coil and a second surface facing the OIS coil structure; and a circuit structure connected electrically to the OIS coil structure and taking control thereof. At least one of the two magnets and the first AF coil cooperate to drive the lens holder along the optical axis, and each of the two magnets and the OIS coil structure cooperate to drive the lens holder along a direction perpendicular to the optical axis.

Preferably, the two respective magnets and the OIS coil structure cooperate to drive the lens holder along two respective directions which are perpendicular to each other.

Preferably, the lens driving device further includes two Hall sensors respectively detecting the lens holder driven along one of the two directions which are perpendicular to each other.

Preferably, the lens driving device further includes a support structure holding the lens holder, wherein the support structure includes an top plate spring portion and a plurality of suspension wires, and each the suspension wire is disposed substantially parallel with the optical axis and integrally formed with the top plate spring portion at one end and connected electrically to the circuit structure at the other end.

Preferably, each of the two magnets can be seen as being divided into essentially two parts by a plane formed by the two suspension wires where the magnet is disposed therebetween.

Preferably, each of the two magnets includes an inner pole facing the first AF coil and an outer pole being blocked by the inner pole from facing the first AF coil, and the inner pole and the outer pole have opposite magnetism.

Preferably, the lens driving device further includes a second AF coil disposed with respect to the lens holder.

Preferably, each of the two magnets includes a lower inner pole facing the first AF coil, a lower outer pole being blocked by the lower inner pole from facing the first AF coil, an upper inner pole facing the second AF coil, and an upper outer pole being blocked by the upper inner pole from facing the second AF coil, the lower inner pole and the lower outer pole have opposite magnetism, and the upper inner pole and the upper outer pole have opposite magnetism.

Preferably, the lens driving device further includes a third Hall sensor disposed on the lens holder and between the first and second AF coils, and detecting the lens holder driven along the optical axis.

Preferably, the lens driving device further includes another OIS coil structure having two coils respectively disposed by two sides of the lens holder on a second plane parallel to the first plane.

Preferably, the coils are Fine Pattern Coils (FP Coils).

Preferably, the first AF coil faces one of the two magnets; and the lens driving device further includes a third Hall sensor disposed on the lens holder, facing the other of the two magnets, and detecting the lens holder driven along the optical axis.

Preferably, the lens driving device further includes: a frame; and a plurality of lead portions respectively holding the lens holder with one end and connected to the frame with the other end.

Preferably, the lead portions and the lens holder are integrally formed.

DETAILED DESCRIPTION OF THE PREFERRED EMBODIMENTS

The present invention now will be described more fully hereinafter with reference to the accompanying drawings, in which preferred embodiments of the present invention are shown.

The present invention provides a lens driving device that is based on a Voice Coil Actuator (VCA) structure and provides the auto-focusing and optical image stabilization (OIS) functions. According to the present invention, these two functions can be realized by a two-magnet scheme, so as to provide an improved structure for the lens driving device with a fewer number of magnets in comparison with the prior art. The manufacturing cost is therefore decreased.

[Embodiment 1]

Figure 1A:
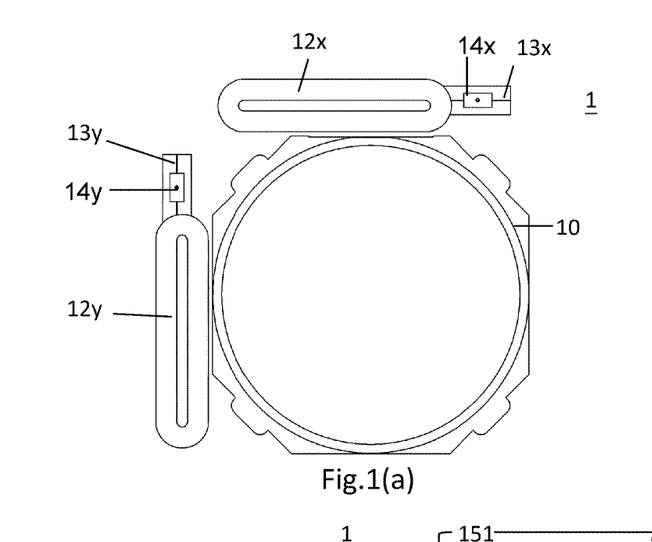
FIGS. 1(a)~1(b) are a schematic bottom exploded view and a schematic perspective view showing the lens driving device according to a first embodiment of the present invention, respectively.
Figure 1B:
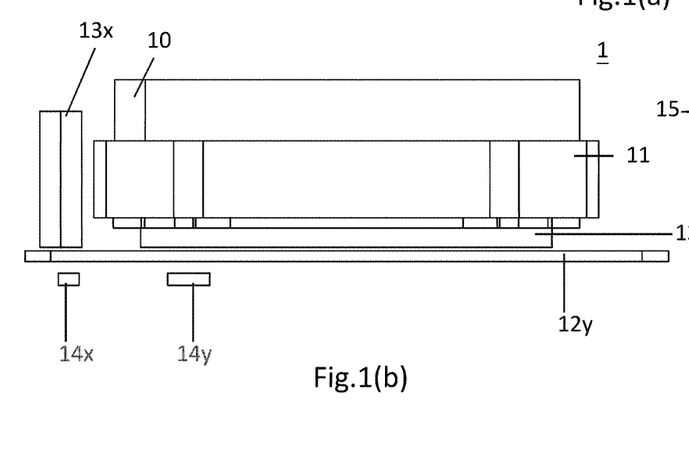

Please refer to FIGS. 1(a)~1(b), which are a schematic bottom exploded view and a schematic perspective view showing the lens driving device according to a first embodiment of the present invention, respectively. It should be noted that some components of the lens driving device are not shown in these figures, so as to avoid an unnecessary obscuring of the present invention.

As shown in FIGS. 1(a) and 1(b), the lens driving device 1 mainly includes a lens holder 10 having an optical axis (not shown), an auto-focusing coil (AF coil) 11, two OIS coils 12x, 12y, and two magnets 13x, 13y. In the present invention, the optical axis of the lens holder 10 is defined as a Z-axis direction for illustration. The AF coil 11 is disposed around an outer periphery of the lens holder 10 with respect to the optical axis. The OIS coils 12x, 12y are disposed on a plane whose normal direction is parallel to the optical axis. Furthermore, two Hall sensors 14x, 14y are disposed respectively below the magnets 13x, 13y.

As depicted in FIG. 1(b), Each of the magnets 13x, 13y has an inner N pole and an outer S pole. The AF coil 11 and the OIS coils 12x, 12y share a common magnet set composed of the magnets 13x, 13y. In this embodiment, the magnets 13x, 13y and the OIS coils 12x, 12y below the magnets are disposed in such a way that each of the magnets 13x, 13y has a first surface facing the AF coil 11, and a second surface facing a respective one of the OIS coils 12x, 12y. Specifically, As FIG. 1(b) depicted, the inner N pole of the magnets 13x, for example, faces the AF coil 11 and the outer S pole of the magnets 13x is blocked by the inner N pole from facing the AF coil 11.

By such configuration, an electromagnetic driving force will be induced inside the AF coil 11 by the current passing through the AF coil 11 and the magnetic field generated by the magnet set of two magnets 13x, 13y. The lens holder 10 is driven by the electromagnetic driving force to move along the optical axis so that the auto-focusing function for the lens driving device 1 is performed.

Besides, the current passing through the OIS coils 12x, 12y and the magnetic field generated by the magnet set of two magnets 13x, 13y will cooperate to induce a further electromagnetic driving force inside the OIS coils, such that the lens holder 10 may be tuned to perform the OIS function (i.e. the so-called anti-shaking function) for the lens driving device 1. Specifically, the electromagnetic driving force induced by the AF coil 11 and the magnets 13x, 13y enables the lens holder 10 to move along the optical axis against the change of the current passing through the OIS coils 12x, 12y, such that the auto-focusing function is realized. The OIS coil 12x interacts with the magnet 13x in x-direction, which is detected by the Hall sensor 14x, and the OIS coil 12y interacts with the magnet 13y in y-direction, which is detected by the Hall sensor 14y. In such a manner, the lens holder 10, the AF coil 11 and the magnets 13x, 13y can move along the directions (i.e. an X-axis direction or a Y-axis direction) perpendicular to the optical axis with respect to the OIS coils 12x, 12y to realize the optical image stabilization (i.e. the so-called anti-shaking function).

Figure 1C:
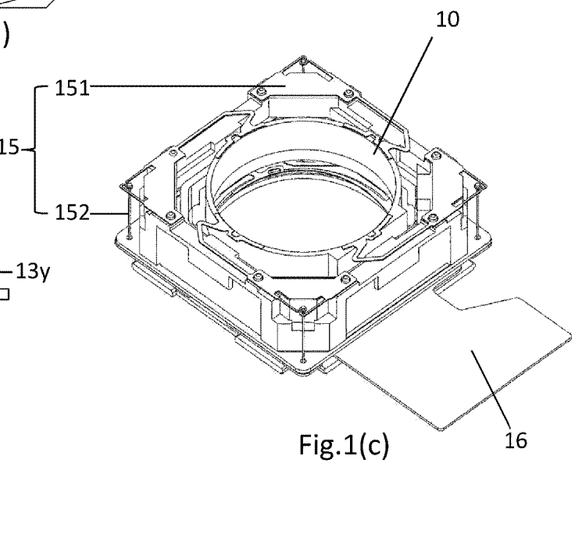
FIG. 1(c) is a schematic perspective view showing the elastic support structure of the lens driving device according to a first embodiment of the present invention.

Please refer to FIG. 1(c), which is a schematic perspective view showing the elastic support structure of the lens driving device according to a first embodiment of the present invention.

The elastic support structure 15, having a top plate spring portion 151, a plurality of suspension wires 152 and a bottom plate spring portion (not shown), wherein each suspension wire 152 disposed substantially parallel with the optical axis and connected with the top plate spring portion 151 at one end and connected electrically to the circuit structure 16 at the other end. The top plate spring portion 151 has an appearance identical to that of the bottom plate spring portion, so as to elastically hold the lens holder 10 along the optical axis for the lens driving device 1 from tilt.

Therefore, the two-magnet scheme according to the first embodiment of the present invention provides an improved and much more compact structure for the lens driving device to enhance the effect of AF and OIS functions thereof. The two magnets are utilized by the AF coil and by the OIS coils simultaneously. Therefore, the numbers of the components can be decreased and the anti-shaking function has a greater performance to achieve a better optical image stabilization.

[Embodiment 2]

Figure 2A:
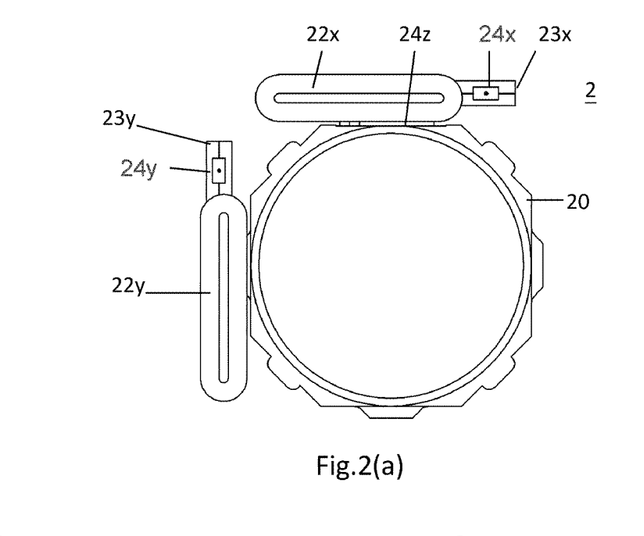
FIGS. 2(a)~2(b) are a schematic bottom exploded view and a schematic perspective view showing the lens driving device according to a second embodiment of the present invention, respectively.
Figure 2B:
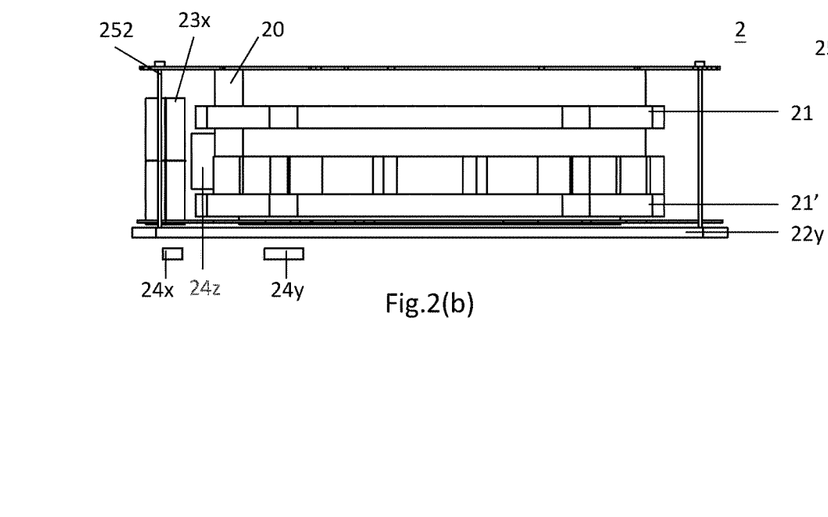

Please refer to FIGS. 2(a)~2(b), which are a schematic bottom exploded view and a schematic perspective view showing the lens driving device according to a second embodiment of the present invention, respectively. It should be noted that some components of the lens driving device are not shown in these figures, so as to avoid an unnecessary obscuring of the present invention.

As shown in FIGS. 2(a) and 2(b), specifically different from the lens driving device according to the first embodiment shown in FIGS. 1(a) and 1(b), the lens driving device 2 now mainly includes a lens holder 20 having an optical axis (not shown), two AF coils 21, 21', two OIS coils 22x, 22y, and two magnets 23x, 23y. In the present invention, the optical axis of the lens holder 12 is defined as a Z-axis for illustration. The AF coil 21 wired in a first direction is disposed around an outer periphery of the lens holder 20 with respect to the optical axis, and the other one 21' wired in a second direction opposite to the first direction is also disposed around the outer periphery of the lens holder 20 with respect to the optical axis and below the AF coil 21. The OIS coils 22*x*, 22*y* are disposed on a plane whose normal direction is parallel to the optical axis. Two Hall sensors 24*x*, 24*y* are disposed respectively below the magnets 23*x*, 23*y*. Furthermore, another Hall sensor 24*z* is disposed on one side of the lens holder 20 and between the two AF coils 21, 21'.

As depicted in FIG. 2(*a*), one side of the magnet 23*x* faces one side of the OIS coil 22*x*, the other side of the magnet 23*x* faces the Hall sensor 24*z*. Specifically, from the point of view of the optical axis of the lens holder 20, most of the Hall sensor 24*z* overlaps with the AF coils 21 & 21', as shown in FIG. 2(*b*). That is, to see along the optical axis toward the lens driving device 2, most of the Hall sensor 24*z* is sheltered by the AF coils 21 & 21', while to see along a direction perpendicular to the optical axis toward the lens driving device 2, the Hall sensor 24*z* fails to be seen for being sheltered by the magnetic 23*x*.

Each of the magnets 23*x*, 23*y* has an upper inner S pole, an upper outer N pole, an lower inner N pole, and an lower outer S pole, as depicted in FIG. 2(*b*). Specifically, the lower inner N pole faces the AF coil 21', the lower outer S pole is blocked by the lower inner N pole from facing the AF coil 21'. The upper inner S pole faces the AF coil 21, and the upper outer N pole is blocked by the upper inner S pole from facing the AF coil 21, as depicted in FIG. 2(*d*).

The AF coil 21 and the OIS coils 22*x*, 22*y* share a common magnet set composed of upper poles of the magnets 23*x*, 23*y*, and the AF coil 21' and the OIS coils 22*x*, 22*y* share a common magnet set composed of lower poles of the magnets 23*x*, 23*y*. In this embodiment, the magnets 23*x*, 23*y* and the OIS coils 22*x*, 22*y* below the magnets are disposed in such a way that each of the magnets 23*x*, 23*y* has a first surface facing the AF coils 21, 21', and a second surface facing a respective one of the OIS coils 22*x*, 22*y*.

By such configuration, an electromagnetic driving force will be induced inside the AF coils 21, 21' by the current passing through the AF coils 21, 21' and the magnetic field generated by the magnet set of two magnets 23*x*, 23*y*. The lens holder 20 is driven to move along the Z-axis so that the auto-focusing function for the lens driving device 2 is performed.

Besides, the current passing through the OIS coils 22*x*, 22*y* and the magnetic field generated by the magnet set of two magnets 23*x*, 23*y* will cooperate to induce a further electromagnetic driving force inside the OIS coils, such that the lens holder 20 may be tuned to perform the OIS function for the lens driving device 2. Specifically, the electromagnetic driving force induced by the AF coils 21, 21' and the magnets 23*x*, 23*y* enables the lens holder 20 to move along the optical axis against the change of the current passing through the OIS coils 22*x*, 22*y*, such that the auto-focusing function is realized. The OIS coil 22*x* interacts with the magnet 23*x* in x-direction, which is detected by the Hall sensor 24*x*, and the OIS coil 22*y* interacts with the magnet 23*y* in y-direction, which is detected by the Hall sensor 24*y*. The Hall sensor 24*z* detects the z-direction interaction. In such a manner, the lens holder 20, the AF coils 21, 21' and the magnets 23*x*, 23*y* can move along the directions (i.e. an X-axis direction or a Y-axis direction) perpendicular to the optical axis with respect to the OIS coils 22*x*, 22*y* to realize the optical image stabilization (i.e. the so-called anti-shaking function).

Figure 2C:
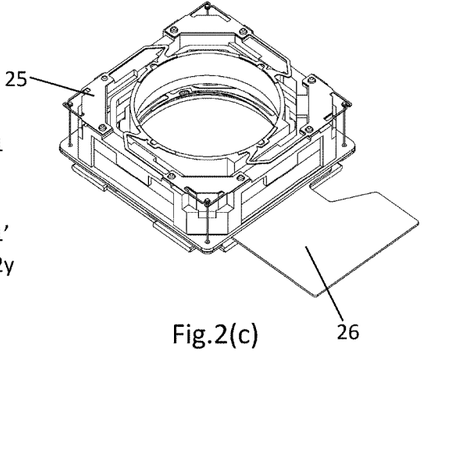
FIG. 2(c) is a schematic perspective view showing the elastic support structure of the lens driving device according to a second embodiment of the present invention.

Please refer to FIG. 2(*c*), which is a schematic perspective view showing the elastic support structure of the lens driving device according to a second embodiment of the present invention. The elastic support structure 25 has the same configuration with that of the lens driving device according to the first embodiment shown in FIG. 1(*c*), so as to elastically hold the lens holder 20 along the optical axis for the lens driving device 2 from tilt. Therefore, the two-magnet scheme according to the second embodiment of the present invention provides an improved and much more compact structure for the lens driving device to enhance the effect of AF and OIS functions thereof. The two magnets are utilized by the AF coils and by the OIS coils simultaneously. Therefore, the numbers of the components can be decreased and the anti-shaking function has a greater performance to achieve a better optical image stabilization.

[Embodiment 3]

Figure 3A:
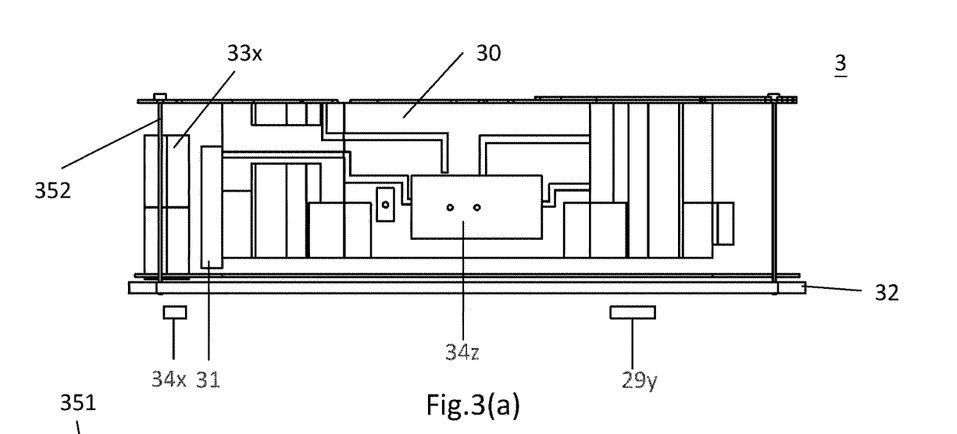
FIG. 3(a) is a schematic perspective view showing the lens driving device according to a third embodiment of the present invention.

Please refer to FIGS. 3(*a*), which is a schematic perspective view showing the lens driving device according to a third embodiment of the present invention. It should be noted that some components of the lens driving device are not shown in these figures, so as to avoid an unnecessary obscuring of the present invention.

As shown in FIGS. 3(*a*), specifically different from the lens driving device according to the second embodiment shown in FIGS. 2(*a*) and 2(*b*), the lens driving device 3 now mainly includes a lens holder 30 having an optical axis (not shown), an AF coil 31, two OIS coils 32*x* (not shown), 32*y*, and two magnets 33*x*, 33*y* (not shown). Two Hall sensors 34*x*, 34*y* (not shown) are disposed respectively below the magnets 33*x*, 33*y*. Another Hall sensor 34*z* is disposed on one side of the lens holder 30. The Hall sensor 34*z* faces the magnet 33*y* and the AF coil 31 faces the magnet 33*x*. The moving-type AF coil 31 functions similarly with the AF coils 21, 21' of the lens driving device according to the second embodiment shown in FIGS. 2(*a*) and 2(*b*).

Figure 3B:
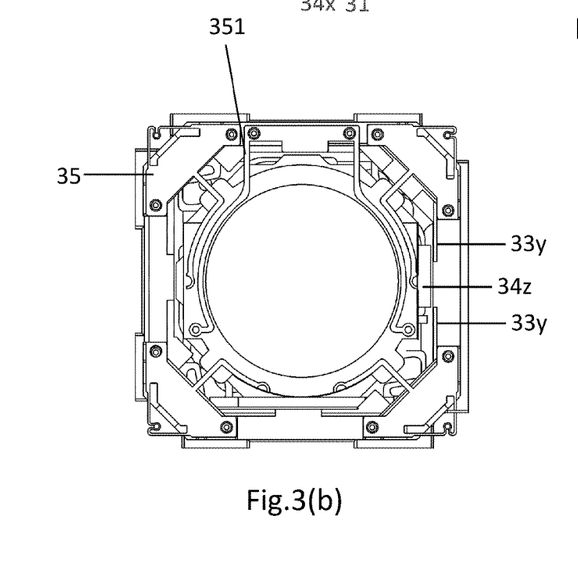
FIGS. 3(b) and 3(c) are a schematic bottom exploded view and a schematic perspective view showing the elastic support structure of the lens driving device according to a third embodiment of the present invention.
Figure 3C:
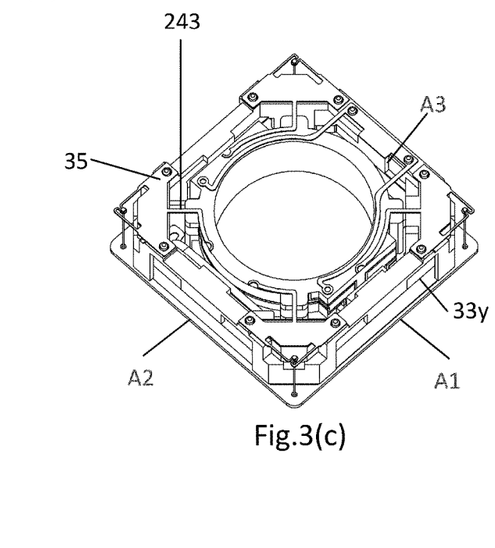

Please refer to FIGS. 3(*b*) and 3(*c*), which are a schematic bottom exploded view and a schematic perspective view showing the elastic support structure of the lens driving device according to a third embodiment of the present invention. The elastic support structure 35 is connected to the lens holder 30 by a plurality of support portions 351, so as to elastically hold the lens holder 30 along the optical axis for the lens driving device 3 from tilt.

As depicted in FIGS. 3(*b*) & 3(*c*), one side of the magnet 33*y* faces one side of the OIS coil 32*y*, the other side of the magnet 33*y* faces the Hall sensor 34*z*. Specifically, from the point of view perpendicular to the optical axis of the lens holder 30, the Hall sensor 34*z* overlaps with the magnet 33*y*. That is, as depicted in FIG. 3(*c*), to see along a direction perpendicular to the optical axis toward the lens driving device 3, the Hall sensor 34*z* is sheltered by the magnetic 33*y*. The Hall sensor 34*z* can be seen if the magnetic 33*y* is removed.

Therefore, the two-magnet scheme according to the third embodiment of the present invention provides an improved and much more compact structure for the lens driving device to enhance the effect of AF and OIS functions thereof. The two magnets are utilized by the AF coil and by the OIS coils simultaneously. Therefore, the numbers of the components can be decreased and the anti-shaking function has a greater performance to achieve a better optical image stabilization.

[Embodiment 4]

Please refer to FIGS. 4(*a*), which is a schematic perspective view showing the lens driving device according to a fourth embodiment of the present invention. It should be noted that some components of the lens driving device are not shown in these figures, so as to avoid an unnecessary obscuring of the present invention.

Figure 4A:
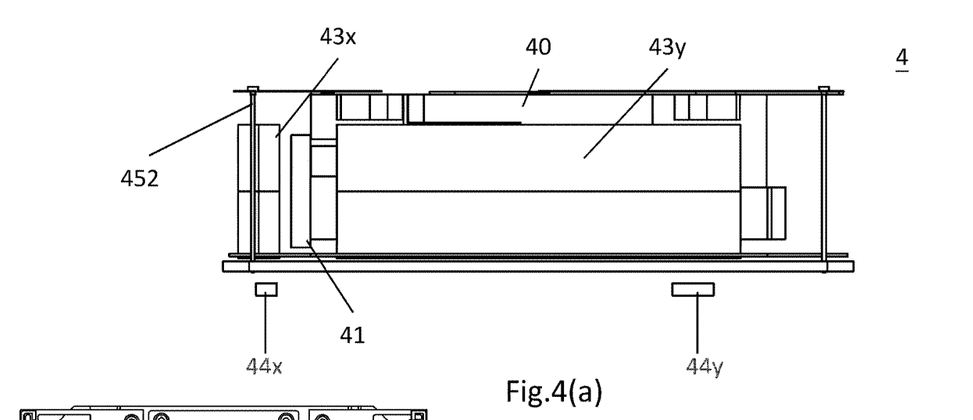
FIG. 4(a) is a schematic perspective view showing the lens driving device according to a fourth embodiment of the present invention.
Figure 4B:
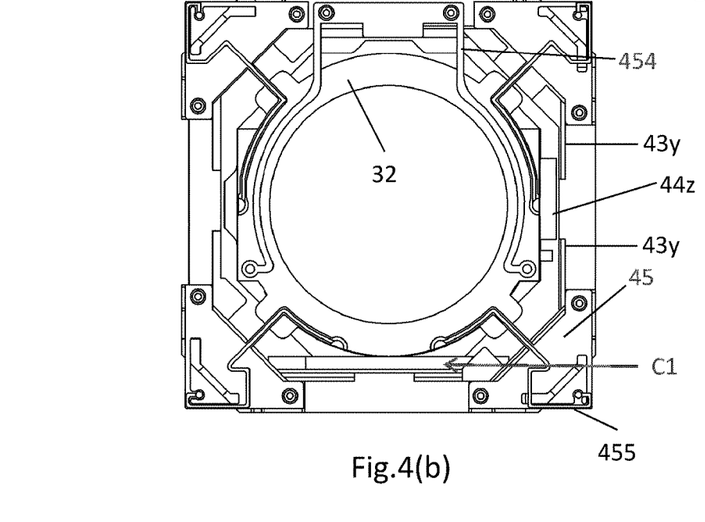
FIGS. 4(b) and 4(c) are a schematic top exploded view and a schematic perspective view showing the elastic support structure of the lens driving device according to a fourth embodiment of the present invention.

As shown in FIGS. 4(*a*), most elements are the same with those of the lens driving device according to the third embodiment shown in FIGS. 3(*a*), except that a plurality of lead portions 454 are integrally formed with the lens holder 40, and the frame 45 is also integrally formed, where the elastic support structure is no more needed, as shown in FIG. 4(b). As shown in FIG. 4(C), The LDS (Laser Direct Structuring, LDS) lines 455 are used to connect electrically the lens holder 40 to the suspension wires 452 and finally to the circuit structure 46.

Figure 4C:
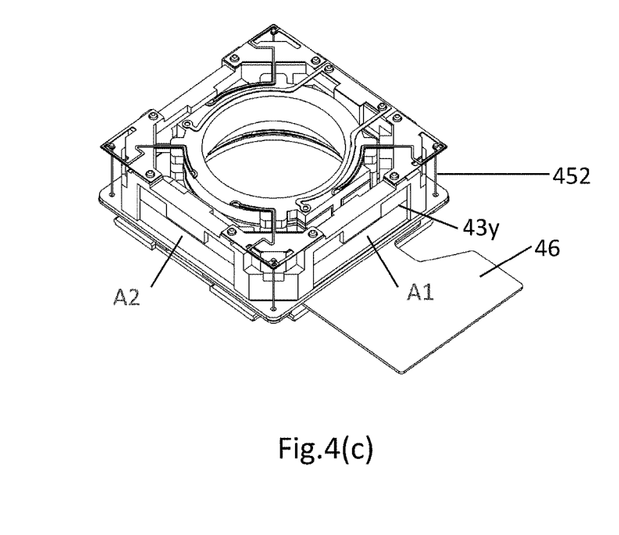

As depicted in FIGS. 4(b) & 4(c), one side of the magnet 43y faces one side of the OIS coil 42y, the other side of the magnet 43y faces the Hall sensor 44z. Specifically, from the point of view perpendicular to the optical axis of the lens holder 40, the Hall sensor 44z overlaps with the magnet 43y. That is, as depicted in FIG. 4(c), to see along a direction perpendicular to the optical axis toward the lens driving device 4, the Hall sensor 44z is sheltered by the magnetic 43y. The Hall sensor 44z can be seen if the magnetic 43y is removed.

Figure 4D:
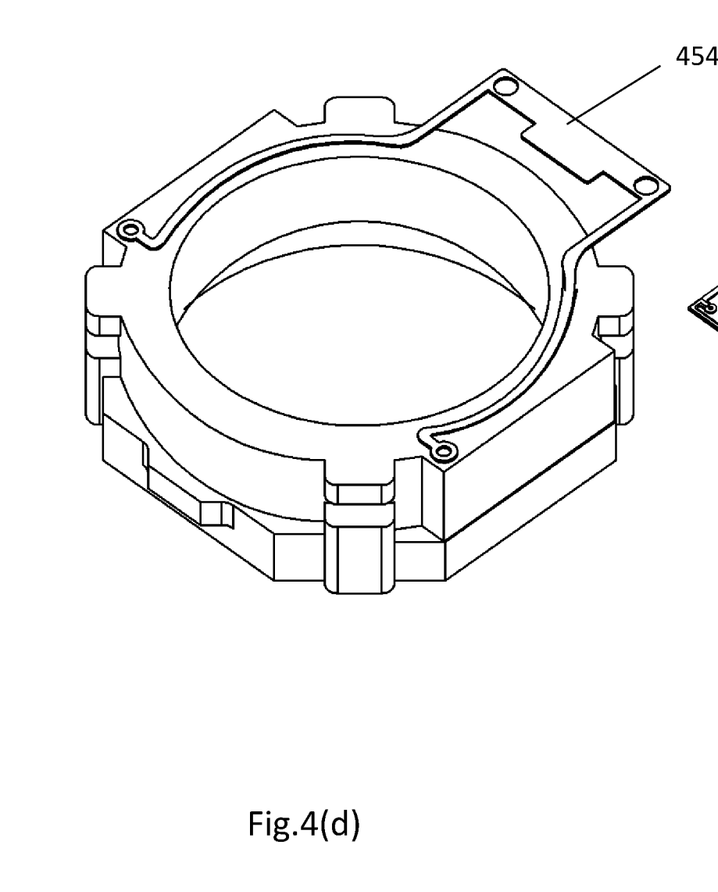
FIGS. 4(d) and 4(e), which are schematic perspective views showing the lead portions and the frame of the lens driving device respectively according to a fourth embodiment of the present invention.
Figure 4E:
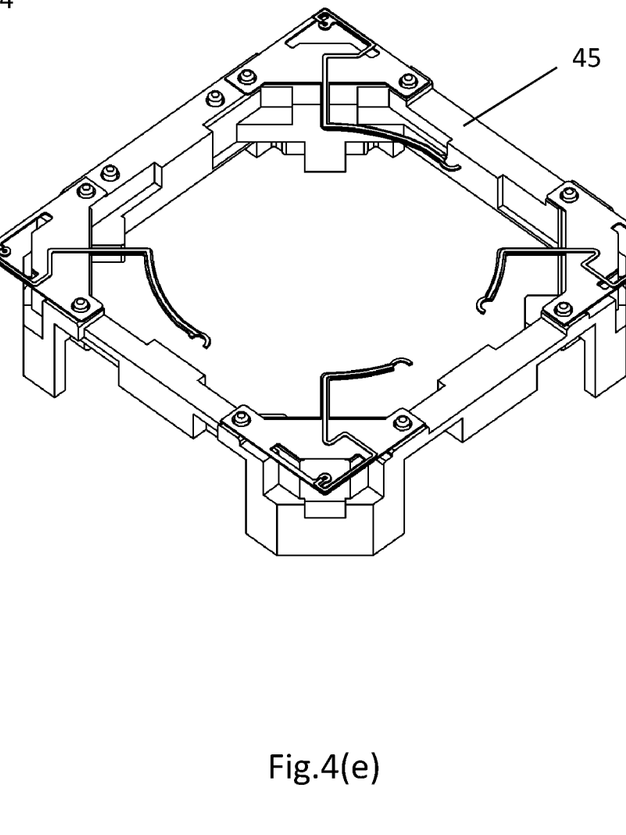

Please refer to FIGS. 4(d) and 4(e), which are schematic perspective views showing the lead portions and the frame of the lens driving device respectively according to a third embodiment of the present invention. In FIG. 4(d), a plurality of lead portions 454 are integrally formed by plastic. In FIG. 4(e), the frame 45 is also integrally formed by plastic. Thereby, the manufacturing cost is decreased.

Figure 4F:
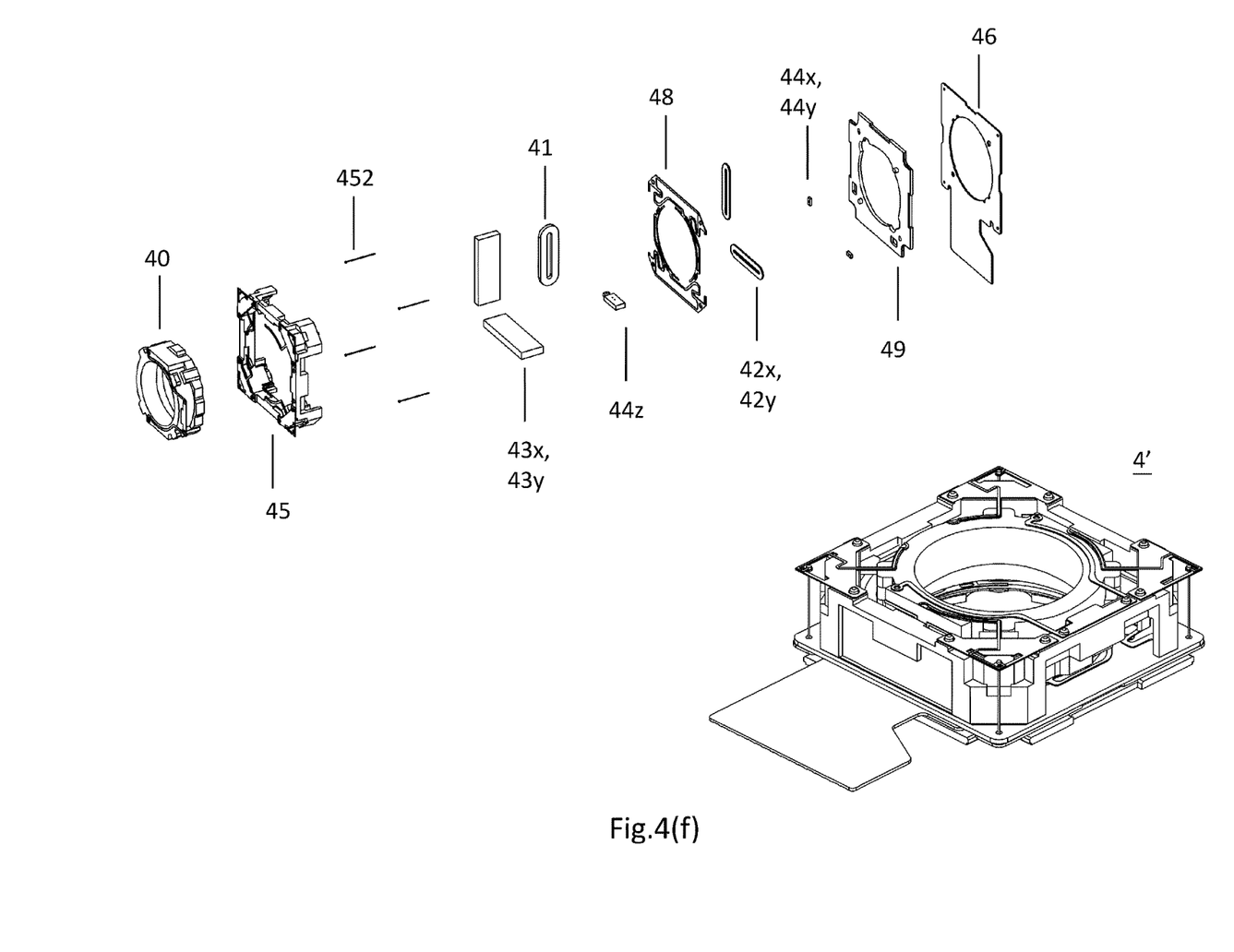
FIG. 4(f) is a perspective exploded view showing the elements of the lens driving device according to a fourth embodiment of the present invention.

Please refer to FIG. 4(f), which is a perspective exploded view showing the elements of the lens driving device according to a fourth embodiment of the present invention. In FIG. 4(f), specifically, the outer case 47 and the bottom case 49 are clearly indicated and the top plate spring portion is omitted, and the frame 45 and the lead portions 454 are integrally formed respectively. Thus, a lens driving device 4' with the auto-focusing function and the anti-shaking function performed on a lens 401 thereof is formed.

Also, in FIG. 4(f), the frame 45 for holding the magnets 43x, 43y is rectangular. The magnet 43x is disposed on one side of the frame 45 and the magnet 43y is disposed on the other side of the frame 45. On the side of the frame 45 where no magnets are disposed, there is only the frame 45 for holding the magnets 13x, 13y faces the lens holder 40.

Therefore, the two-magnet scheme according to the fourth embodiment of the present invention provides an improved and much more compact structure for the lens driving device to enhance the effect of AF and OIS functions thereof. The two magnets are utilized by the AF coil and by the OIS coils simultaneously. Therefore, the numbers of the components can be decreased and the anti-shaking function has a greater performance to achieve better optical image stabilization.

[Embodiment 5]

Figure 5A:
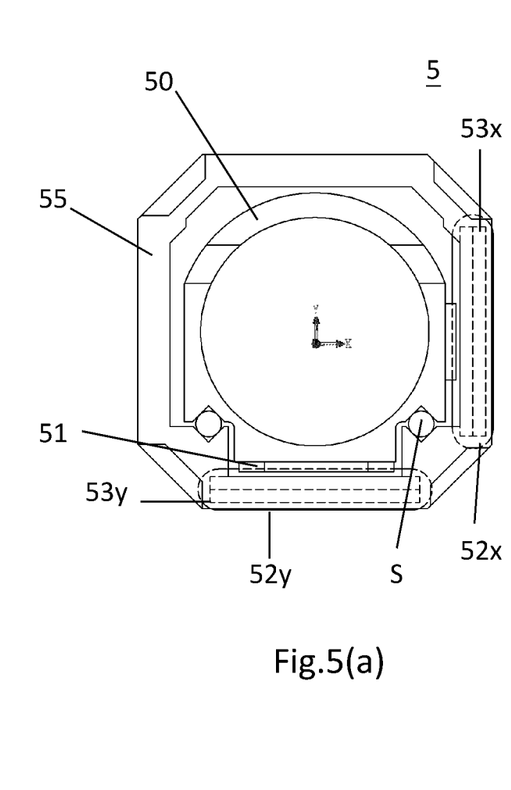
FIGS. 5(a) and 5(b) are a schematic top exploded view and a schematic bottom view showing the lens driving device according to a fifth embodiment of the present invention.
Figure 5B:
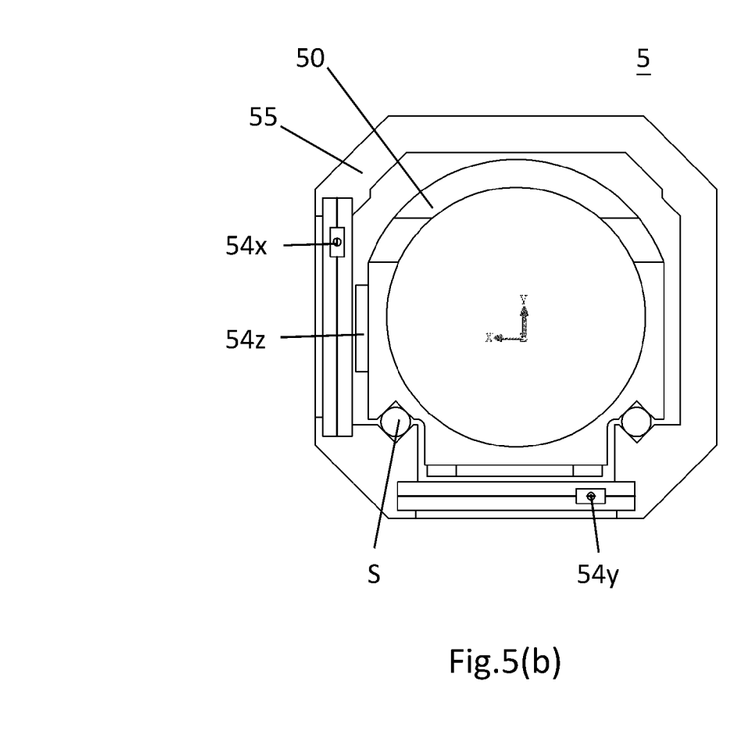

Please refer to FIGS. 5(a) and 5(b), which are a schematic top exploded view and a schematic bottom view showing the lens driving device according to a fifth embodiment of the present invention. It should be noted that some components of the lens driving device are not shown in these figures, so as to avoid an unnecessary obscuring of the present invention.

As shown in FIGS. 5(a) and 5(b), specifically different from the lens driving device according to the second embodiment shown in FIGS. 2(a) and 2(b), between one side of the lens holder 50 and the corresponding side of the frame 55 are disposed two spacer S, preferably of ball type. The lens driving device 5 mainly includes a lens holder 50 having an optical axis (not shown), the AF coil 51, two OIS coils 52x, 52y, and two magnets 53x, 53y. In the present invention, the optical axis of the lens holder 50 is defined as the Z-axis for illustration. The AF coil 51 is disposed around an outer periphery of the lens holder 50 with respect to the optical axis. The OIS coils 52x, 52y are disposed on a plane whose normal direction is perpendicular to the optical axis. Two Hall sensors 54x, 54y are disposed respectively below the magnets 53x, 53y. Furthermore, another Hall sensor 54z is disposed on one side of the lens holder 50.

Figure 5C:
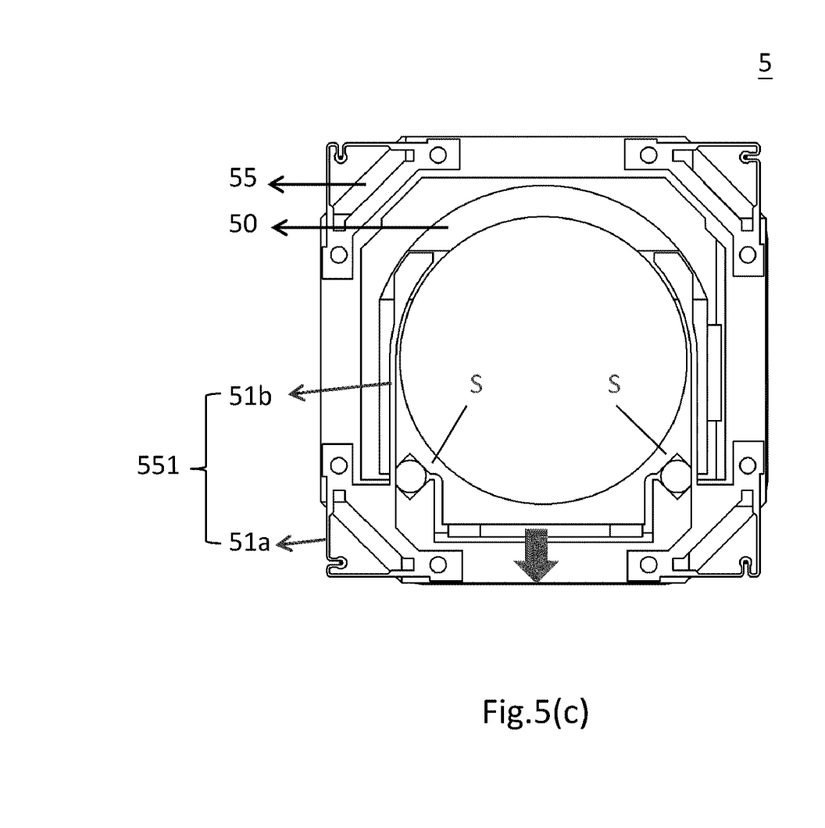
FIGS. 5(c) and 5(d) are a schematic top exploded view and a schematic bottom view showing the elastic support structure of the lens driving device according to a fifth embodiment of the present invention.
Figure 5D:
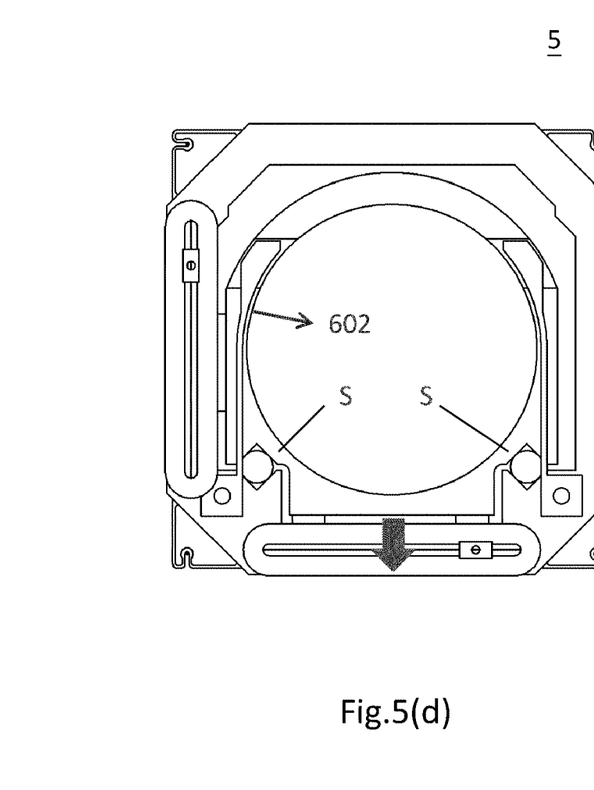

Please refer to FIGS. 5(c) and 5(d), which are a schematic top exploded view and a schematic bottom view showing the elastic support structure of the lens driving device according to a fifth embodiment of the present invention. As shown in FIG. 5(c), the top plate spring portion 551 has an outer string 551a and an inner string 551b, where the outer string 551a is connected to the frame 55 for supporting the lens driving device 5 and for transmitting electricity. The inner string 551b is connected to the lens holder 50 to provide a side force (downward arrow shown in FIG. 5(c)) with which the spacers S can be pressed against the lens holder 50, so that the friction can be decreased and the shift of the lens holder 50 due to shake can be limited.

Figure 5E:
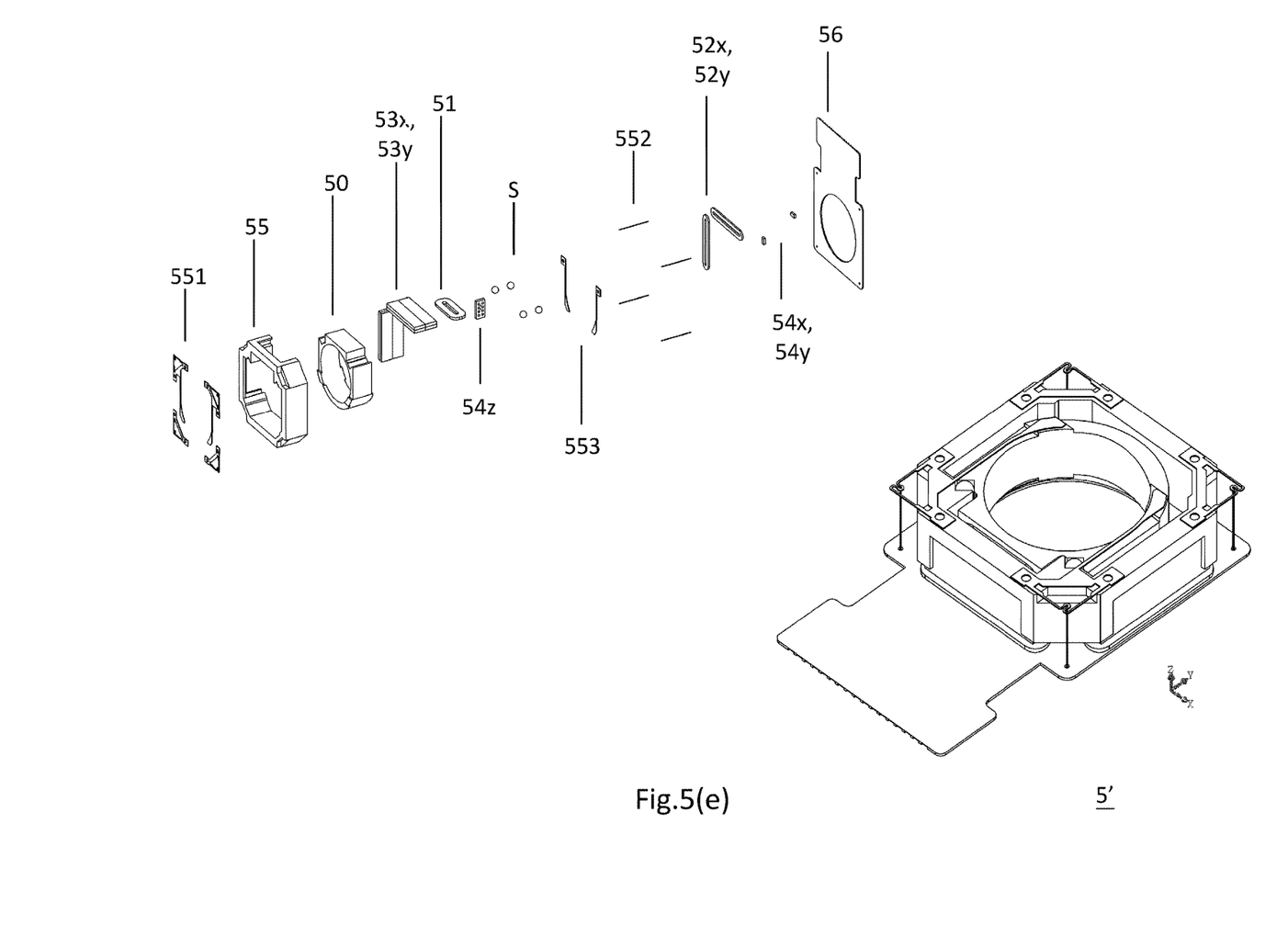
FIG. 5(e) is a perspective exploded view showing the elements of the lens driving device according to a fifth embodiment of the present invention.

Please refer to FIGS. 5(e), which is a perspective exploded view showing the elements of the lens driving device according to a fifth embodiment of the present invention. As depicted in FIG. 5(e), a lens driving device 5' with the auto-focusing function and the anti-shaking function is formed by the combination of the elements described in FIGS. 5(a)~5(d).

In FIG. 5(e), the frame 55 for holding the magnets 53x, 53y is rectangular. The magnet 53x is disposed on one side of the frame 55 and the magnet 53y is disposed on the other side of the frame 55. On the side of the frame 55 where no magnets are disposed, there is only the frame 55 for holding the magnets 53x, 53y faces the lens holder 50.

Therefore, the two-magnet scheme according to the fifth embodiment of the present invention provides an improved and much more compact structure for the lens driving device to enhance the effect of AF and OIS functions thereof. The two magnets are utilized by the AF coil and by the OIS coils simultaneously. Therefore, the numbers of the components can be decreased and the anti-shaking function has a greater performance to achieve better optical image stabilization.

[Alternative Disposition of OIS Coils]

Figure 6A:
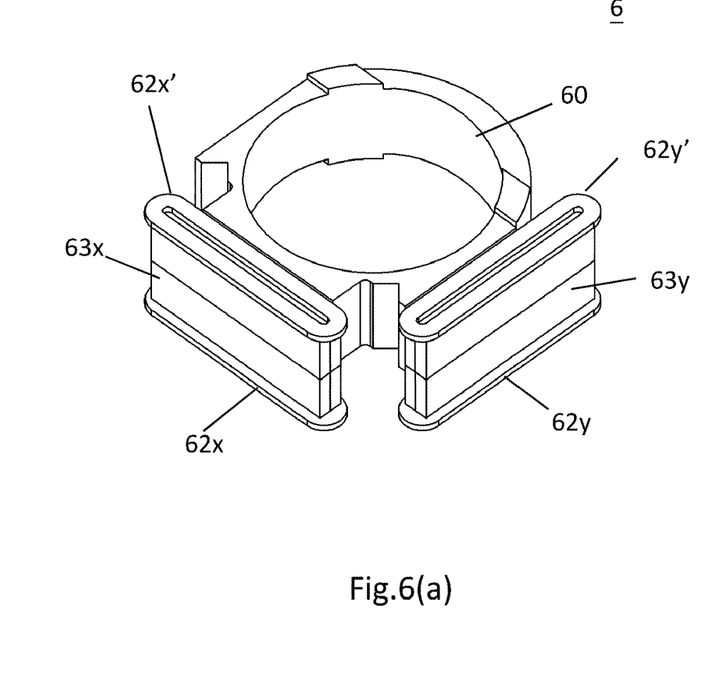
FIGS. 6(a) & 6(b) are schematic perspective views showing two alternative dispositions of OIS coils of the lens driving device according to the present invention.
Figure 6B:
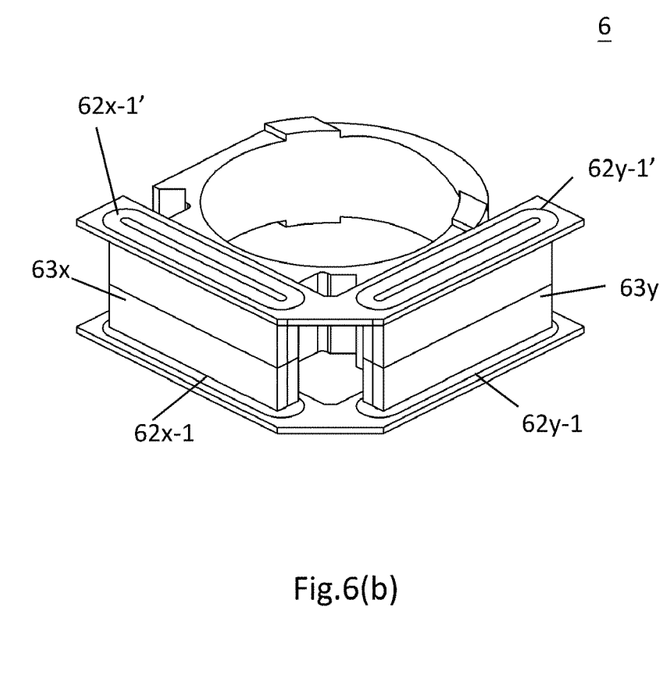

Please refer to FIGS. 6(a) & 6(b), which are schematic perspective views showing two alternative dispositions of OIS coils of the lens driving device according to the present invention. As shown in FIG. 6(a), the number of the OIS coils of the aforementioned first to fifth embodiments can also be increased to 4; that is, two additional top OIS coils 62x', 62y' are further disposed in the lens driving device except for the OIS coils 62x, 62y. The additional OIS coil 62x' is disposed on the top of the magnet 63x and the OIS coil 62x is disposed on the bottom of the magnet 63x. The additional OIS coil 62y' is disposed on the top of the magnet 63x and the OIS coil 62y is disposed on the bottom of the magnet 63y. With the cooperation of the electromagnetic driving force induced in the top OIS coils 62x', 62y' and the bottom OIS coils 62x, 62y, the lens holder 60 can be tuned to perform the OIS function much more stably.

Except for the traditional type coils, the OIS coils of FIG. 6(a) can also be implemented with Fine Pattern Coils (FP Coils) 62x-1, 62y-1, 62x-1', 62y-1', as shown in FIG. 6(b). Similarly, the OIS coils used in the aforementioned first to fifth embodiments can also be replaced with the flat pack coils, so that the lens driving device can be more compact and the manufacturing difficulty thereof can be decreased. The improved magnet disposition of the present invention is not limited by the type of the OIS coils.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that structures within the scope of these claims and their equivalents be covered thereby.

What is claimed is:

1. A lens driving device, comprising:
   a lens holder defining an optical axis;
   a first auto-focusing (AF) coil disposed with respect to the lens holder;
   an optical image stabilizer (OIS) coil structure having two coils respectively disposed by two sides of the lens holder on a first plane having a normal direction parallel to the optical axis;
   two magnets respectively disposed with respect to the respective coils, each of the magnets having a first surface facing the first AF coil and a second surface facing the respective coil, wherein the first surface is perpendicular to the second surface,
   wherein the lens driving device has a substantially rectangular shape, and the magnets are only disposed on two adjacent sides of the lens driving device;
   a support structure holding the lens holder, wherein the support structure comprises a top plate spring portion and a plurality of suspension wires, and each of the suspension wires is disposed substantially parallel with the optical axis and integrally formed with the top plate spring portion at one end and connected electrically to the circuit structure at the other end; and
   a circuit structure connected electrically to the OIS coil structure and taking control thereof;
   wherein the suspension wires comprises a first suspension wire, a second suspension wire, a third suspension wire, and a fourth suspension wire sequentially disposed at four corners of the substantially rectangular shape, the magnets are respectively disposed between the first suspension wire and the second suspension wire, between the second suspension wire and the third suspension wire, and no magnet is disposed between the first suspension wire and the fourth suspension wire,
   wherein at least one of the two magnets and the first AF coil cooperate to drive the lens holder along the optical axis, and
   each of the two magnets and the OIS coil structure cooperate to drive the lens holder along a direction perpendicular to the optical axis.

2. The lens driving device according to claim 1, wherein the two respective magnets and the OIS coil structure cooperate to drive the lens holder along two respective directions which are perpendicular to each other.

3. The lens driving device according to claim 2, further comprising two Hall sensors respectively detecting the lens holder driven along one of the two directions which are perpendicular to each other.

4. The lens driving device according to claim 1, each of the two magnets being divided into essentially two parts by a plane formed by the two suspension wires where the magnet is disposed therebetween.

5. The lens driving device according to claim 1, wherein each of the two magnets comprises an inner pole facing the first AF coil and an outer pole being blocked by the inner pole from facing the first AF coil, and the inner pole and the outer pole have opposite magnetism.

6. The lens driving device according to claim 1, wherein the respective coils are only disposed on the adjacent sides of the lens driving device.

* * * * *